UNITED STATES PATENT OFFICE.

JAMES W. McDONOUGH, OF CHICAGO, ILLINOIS.

ART OF PRODUCING COLORED PHOTOGRAPHS.

SPECIFICATION forming part of Letters Patent No. 471,186, dated March 22, 1892.

Application filed March 14, 1891. Serial No. 385,298. (No specimens.)

*To all whom it may concern:*

Be it known that I, JAMES W. McDONOUGH, a citizen of the United States, residing at Chicago, Illinois, have invented a certain new and useful Improvement in the Art of Producing Colored Photographs, of which the following is a specification.

I take a plain glass plate and flow or cover it with a coat of varnish or similar material which will dry tacky. I then dust the plate with a mixture of colors composed of fine or powdered particles containing the colors desired. I thus obtain a colored surface composed of particles lying side by side, which have the properties of stippled colors instead of the properties of a true mixture of pigments. In order to get these colored particles, I use powdered glass, transparent pigments, gelatine, rosin, or shellac stained by aniline dyes, &c. The glass colors, after being dusted upon the surface of the glass plate, may be melted into the body of the plate by fire, if desired.

In the preparation of a glass negative with shellac stained in colors the plate may be flowed or covered with a plain collodion, to which is added a small quantity of glycerine, so that when the collodion is dry it will remain tacky enough to retain colored shellac-dust in a single layer. I then take a sufficient quantity of clean white shellac dissolved in alcohol, to which I add aniline colors—say for one lot red and yellow colors in such proportions that the result will be a red which, when viewed by transmitted light in thin layers, will cut off or absorb as much green, blue, violet, and yellow as possible, or which, in other words, will transmit, as far as possible, a pure red. Another lot is colored with as pure a green as may be formed by mixtures, adding yellow to absorb blue. Another lot is colored blue. As the mixtures of colors formed in this way by red and green do not form a bright yellow, I may use, in addition, another lot colored as near the yellow of the spectrum as possible. These lots after being thus colored are allowed to dry, forming colored masses, which are then reduced to powder by grinding, sifting, &c. If now proper proportions of red and green are mixed, a nearly black mass will be formed, and if proper proportions of red, green, yellow, and blue are mixed a mass will be formed that is nearly black; but if this same mixture is dusted or thinly spread upon the prepared glass surface it will reflect or transmit a mixture of all these colors, which will be white in proportion to the purity of color, cleanliness of mixture, and quantity of light transmitted or deflected. The glycerine may be washed out, so that only the colored particles in the masses in which they are arranged remain. When viewed under the microscope, the white surface is seen to be composed of a multitude of different-colored particles lying side by side and separated by small distances. By subjecting the plate thus prepared to just sufficient heat to melt the shellac, two results are obtained: First, the powdery particles melt and fill the gaps, forming a substance which when viewed in the microscope resembles a window formed of a mosaic of small colored pieces, each adjoining the other, while if the heat be carried further the edges melt into each other and further mixtures of colors are obtained; second, the surface of the plate, which before heating reflects all the colors and resembles the surface of ground glass or glass covered with a white powder, in what is termed a "mat-surface," becomes under the influence of heat transparent by the flattening of the particles. This result may also be obtained, in a measure, by covering the surface with varnish, so as to make it smooth. A plate formed in this way upon any suitable material may be flowed or covered with such sensitive compounds as are used in taking photographs, or an orthrochromatic dry-plate may be rendered sticky and a mixture of colored dust brushed over it to form the plate.

The plate may be developed by the use of the so-called "alkaline pyro-developer," so that the colored particles will adhere to the surface, which is penetrated by the same colored light. Those particles which do not allow the passage of colored rays on account of absorption may be washed off. Thus blue rays will cause blue particles to remain as an image, white light all the colored particles in that space acted upon by white light, and all will be removed where black occurs, which does not act upon the photographic film. This picture may be used as a negative or back with a black surface, as in an ambrotype. Where the sensitive film is either flowed over or transferred to the glass plate upon which the colors are attached, it may be exposed in the camera reversed, or so that the image may act through the glass from the back, and the gelatine and silver not acted upon by the pyro-developer may be removed by hot water or a negative or positive formed by any of the well-known developers and processes. The colored image is formed by the reflection of light through the colored particles or by the transmission of light through them.

The use of the orthrochromatic sensitive plates and colored screens before the camera for the purpose of sifting light and regulating the action of different colors upon the film is too well known to require explanation.

What I regard as new, and desire to secure by Letters Patent, is—

1. The process of preparing photographic plates, which consists in covering them with colored particles and then applying a sensitive compound to them, substantially as described.

2. The process of preparing photographic plates, which consists in covering them with colored particles, then subjecting them to heat, and then applying a sensitive compound to them, substantially as described.

3. A plate for photographic purposes, having upon its surface a layer of different-colored particles lying side by side and in such proportions as to produce a white or light-colored transparent surface, to which may be applied a sensitive compound, substantially as described.

4. A plate for photographic purposes, formed of glass or other suitable substances of any color, a layer of different-colored particles spread thereon, and a film of sensitive photographic compound spread over the particles, substantially as described.

JAMES W. McDONOUGH.

Witnesses:
ANNIE C. COURTENAY,
THOMAS A. BANNING.